United States Patent
Ka et al.

(10) Patent No.: US 12,119,515 B2
(45) Date of Patent: Oct. 15, 2024

(54) SEPARATOR FOR AN ELECTROCHEMICAL DEVICE INCLUDING A POROUS ORGANIC/INORGANIC COMPOSITE COATING LAYER AND AN ELECTROCHEMICAL DEVICE INCLUDING SAME

(71) Applicant: LG ENERGY SOLUTION, LTD., Seoul (KR)

(72) Inventors: Kyung-Ryun Ka, Daejeon (KR); Min-Ji Kim, Daejeon (KR); Seung-Hyun Lee, Daejeon (KR); Hye-Won Kim, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 0 days.

(21) Appl. No.: 18/647,536

(22) Filed: Apr. 26, 2024

(65) Prior Publication Data

US 2024/0274979 A1    Aug. 15, 2024

Related U.S. Application Data

(63) Continuation of application No. PCT/KR2023/003116, filed on Mar. 7, 2023.

(30) Foreign Application Priority Data

May 26, 2022 (KR) ........................ 10-2022-0064640

(51) Int. Cl.
*H01M 50/446* (2021.01)
*H01M 10/052* (2010.01)
(Continued)

(52) U.S. Cl.
CPC ....... *H01M 50/446* (2021.01); *H01M 10/052* (2013.01); *H01M 50/42* (2021.01); *H01M 50/426* (2021.01); *H01M 50/449* (2021.01)

(58) Field of Classification Search
CPC ............ H01M 50/446; H01M 50/449; H01M 50/426; H01M 50/42
See application file for complete search history.

(56) References Cited

U.S. PATENT DOCUMENTS

2020/0075910 A1*  3/2020  Kim ................... H01M 50/426
2024/0141198 A1*  5/2024  Beaume ................ H01G 11/52

FOREIGN PATENT DOCUMENTS

JP           6669174 B2      3/2020
KR    10-2013-0093977 A     8/2013
(Continued)

OTHER PUBLICATIONS

International Search Report for PCT/KR2023/003116 (PCT/ISA/210) mailed on Jun. 30, 2023.

*Primary Examiner* — Christopher P Domone
(74) *Attorney, Agent, or Firm* — Birch, Stewart, Kolasch & Birch, LLP (57) ABSTRACT

Disclosed is a separator suitable for an electrochemical device a porous including polymer substrate and an organic/inorganic composite porous coating layer on at least one side of the porous polymer substrate. The organic/inorganic composite porous coating layer includes particulate binder polymers and first inorganic particles, the particulate binder polymers include (a) hybrid polymer particles of a fluorine-containing polymer and an acrylic-containing polymer and (b) acrylic-containing polymer particles, the average particle diameter D50 of the acrylic-containing polymer particles "a" is in a range of 1 μm to 7.5 μm, the average particle diameter D50 of the inorganic particles "b" is in a range of 200 nm to 800 nm, a/b is in a range of 2 to 15, and the average particle diameter D50 of the hybrid polymer particles is smaller than the average particle diameter D50 of the acrylic-containing polymer particles.

20 Claims, 2 Drawing Sheets

(51) Int. Cl.
    *H01M 50/42*     (2021.01)
    *H01M 50/426*     (2021.01)
    *H01M 50/449*     (2021.01)

(56) References Cited

FOREIGN PATENT DOCUMENTS

| | | |
|---|---|---|
| KR | 10-2016-0048697 A | 5/2016 |
| KR | 10-2016-0118979 A | 10/2016 |
| KR | 10-2018-0063649 A | 6/2018 |
| KR | 10-2019-0004158 A | 1/2019 |
| KR | 10-2020-0026595 A | 3/2020 |
| KR | 10-2020-0082480 a | 7/2020 |
| KR | 10-2021-0109478 A | 9/2021 |
| KR | 10-2022-0011097 A | 1/2022 |
| KR | 10-2022-0024180 A | 3/2022 |
| KR | 10-2022-0051819 A | 4/2022 |

\* cited by examiner

SEPARATOR FOR AN ELECTROCHEMICAL DEVICE INCLUDING A POROUS ORGANIC/INORGANIC COMPOSITE COATING LAYER AND AN ELECTROCHEMICAL DEVICE INCLUDING SAME

CROSS REFERENCE TO RELATED APPLICATIONS

The present application is a By-Pass Continuation of International Application PCT/KR2023/003116, filed Mar. 7, 2023, which claims priority to Korean Patent Application No. 10-2022-0064640, filed May 26, 2022, the entire contents of all of which are herein expressly incorporated by reference in their entirety.

BACKGROUND OF INVENTION

1. Field of the Invention

The present disclosure relates to separator for an electrochemical device having improved compression resistance, adhesion force in a dry state (dry adhesion), and adhesion force in a state impregnated with an electrolyte (wet adhesion), and to an electrochemical device including the same.

2. Description of the Related Art

There continues to be a shift towards widespread adoption of electrochemical devices, such as batteries, in a myriad of forms. This shift is driven in part by the pressing need to mitigate the adverse environmental and climate impacts associated with traditional internal combustion engines and other non-renewable means of power generation and storage. Thus, the development of electrochemical device technologies has become an imperative.

Generally, electrochemical devices such as lithium secondary batteries are made up from a cathode, a separator, an anode, and an electrolyte, for instance, an electrolyte solution. Electrochemical devices include those that are high-density energy storage devices capable of being charged and discharged through reversible conversion between chemical energy and electrical energy. Such devices are widely used in small electronic devices, such as mobile phones, laptop computers, and the like, as well as electric vehicles (EVs), hybrid electric vehicles (HEVs), urban air mobility (UAM) vehicles, and electric bicycles. Simultaneously, there is a growing demand for stationary energy storage systems, notably in the residential and industrial sectors, powered by solar and wind generators. Such technologies are important to deal with environmental problems, high oil prices, energy efficiency, and energy storage.

In the manufacture and use of such an electrochemical device, securing its safety is an important area of research. In particular, a separator made of a porous polymer substrate commonly used in an electrochemical device may exhibit a heat shrinkage behavior at a high temperature or the like due to material characteristics and manufacturing process characteristics thereof. This may lead to the generation of an internal short circuit. Recently, to secure the safety of lithium secondary batteries, a separator in which a mixture of inorganic particles and a binder polymer is coated on a porous polymer substrate to form an organic/inorganic composite porous coating layer has been under continued development.

In general, an electrode assembly may be manufactured through a lamination process in which a separator and an electrode are bonded together by heat and pressure. In such a lamination process, the higher the heat and pressure applied, the higher the binding force between the electrode and the separator. Recently, processing speeds have been increased for the purposes of improving productivity, the amount of time for which heat is applied to the separator has decreased. However, due to the application of high pressures, the organic/inorganic composite porous coating layer presses the porous polymer substrate to reduce the thickness and may cause deformation of the pore structure. For instance, the porous polymer substrate may be damaged when the inorganic particles are locally agglomerated, or protrusions are formed, and thus there is a concern that degradation of dielectricity of the separator may occur.

On the other hand, when an electrode assembly is formed by laminating an electrode and a separator having an organic/inorganic composite porous coating layer, there may be a high risk that the electrode and the separator are separated due to insufficient adhesive force. In such a case, inorganic particles that are deintercalated during the separation process may act as a local defect in the electrochemical device.

Accordingly, a separator in which an acrylic-containing polymer binder is applied to an organic/inorganic composite porous coating layer to improve adhesion force between an electrode and the separator has been proposed. When using such an acrylic-containing polymer binder, it is found that dry adhesion is improved, but there may still be a problem in that the wet adhesion is reduced due to problems such as swelling or dissolution of the acrylic-containing polymer binder by the electrolyte after application to the electrochemical device.

SUMMARY OF THE INVENTION

An objective of the present disclosure is to provide an electrochemical device separator in which a phenomenon of the decrease in the dielectricity of the separator, such as a decrease in the thickness of the porous polymer substrate or deformation of the pore structure due to high pressure applied when laminating a separator having an organic/inorganic composite porous coating layer on at least one side of the porous polymer substrate and an electrode is improved, and at the same time, the binding force with the electrode may be improved in both dry and wet conditions.

In addition, another objective of the present disclosure is to provide an electrochemical device, including a separator having the above-described characteristics.

Other objectives and advantages of the present disclosure will be understood by the following description. On the other hand, it will be easily understood that the objectives and advantages of the present disclosure may be realized by means or methods described in the claims and combinations thereof.

An aspect of the present disclosure relates to an electrochemical device separator, the separator, including a porous polymer substrate and an organic/inorganic composite porous coating layer on at least one side of the polymer substrate, in which the organic/inorganic composite porous coating layer includes particulate binder resins and first inorganic particles, the particulate binder polymers include (a) hybrid polymer particles of a fluorine-containing polymer and an acrylic-containing polymer and (b) acrylic-containing polymer particles, the average particle diameter (D50) "a" of the acrylic-containing polymer particles is in a range of 1 μm to 7.5 μm, the average particle diameter (D50) "b" of the first inorganic particles is in a range of 200 nm to 800 nm, a/b is 2 to 15, and the average particle diameter (D50) of the hybrid polymer particles is smaller than the average particle diameter (D50) of the acrylic-containing polymer particles.

Another aspect of the present disclosure is that wherein the average particle diameter (D50) (a) of the acrylic-containing polymer particles is in a range of 2 μm to 6 μm, and the average particle diameter (D50) (b) of the first inorganic particles is in a range of 300 nm to 700 nm, and a/b is 5 to 12.

Another aspect of the present disclosure is that wherein the average particle diameter (D50) of the acrylic-containing polymer particles is 4 to 20 times larger than the average particle diameter (D50) of the hybrid polymer particles.

Another aspect of the present disclosure is that wherein the hybrid polymer particles have an average particle diameter (D50) in a range of 100 μm to 500 μm.

Another aspect of the present disclosure is that wherein the mixed weight ratio of the hybrid polymer particles and the acrylic-containing polymer particles is 8:2 to 2:8.

Another aspect of the present disclosure is that wherein the Tg of the acrylic polymer included in the hybrid polymer particles is more than 10° C. lower than the Tg of the acrylic polymer included in the acrylic-containing polymer particles.

Another aspect of the present disclosure is that wherein the Tg of the acrylic polymer included in the hybrid polymer particles is 10° ° C. to 30° C., and the Tg of the acrylic polymer included in the acrylic-containing polymer particles is 30° ° C. to 50° C.

Another aspect of the present disclosure is that wherein the fluorine-containing polymer is a homopolymer of vinylidene fluoride, a copolymer of vinylidene fluoride and another polymerizable monomer, or a mixture of two or more thereof.

Another aspect of the present disclosure is that wherein the another polymerizable monomer is at least one selected from the group consisting of tetrafluoroethylene, hexafluoropropylene, trifluoroethylene, chlorofluoroethylene, 1,2 difluoroethylene, perfluoro (methylvinyl) ether, perfluoro (ethylvinyl) ether, perfluoro (propylvinyl) ether, perfluoro (1,3 dioxole), perfluoro (2,2-dimethyl-1,3-dioxole), trichloroethylene, and vinyl fluoride.

Another aspect of the present disclosure is that wherein the fluorine-containing polymer is a copolymer of vinylidene fluoride and hexafluoropropylene.

Another aspect of the present disclosure is that wherein the content of the another polymerizable monomer is 18 to 20% by weight of the copolymer.

Another aspect of the present disclosure is that wherein the acrylic polymer constituting the hybrid polymer particles and the acrylic polymer constituting the acrylic-containing polymer particles each independently include an alkyl (meth)acrylate repeating unit having an alkyl group having 1 to 18 carbon atoms.

Another aspect of the present disclosure is that wherein the organic/inorganic composite porous coating layer further includes a non-particulate acrylic-containing polymer.

Another aspect of the present disclosure is that wherein the non-particulate acrylic-containing polymer has a Tg of 0° C. or less.

Another aspect of the present disclosure is that wherein the organic/inorganic composite porous coating layer includes second inorganic particles different from the first inorganic particles, and the average particle diameter (D50) of the second inorganic particles is smaller than the average particle diameter (D50) of the first inorganic particles. In another aspect, the average particle diameter (D50) of the second inorganic particles is smaller or equal to the average particle diameter (D50) of the first inorganic particles.

Another aspect of the present disclosure is that wherein the average particle diameter (D50) of the second inorganic particles is in a range of 100 nm to 500 nm.

Another aspect of the present disclosure is that wherein the first t inorganic particles are alumina, and the second inorganic particles are boehmite.

Another aspect of the present disclosure is that wherein the organic/inorganic composite porous coating layer includes the particulate binder resins in an amount of 1% to 30% by weight based on the total weight of the organic/inorganic composite porous coating layer.

Another aspect of the present disclosure is that wherein the organic/inorganic composite porous coating layer is formed by coating and then drying a slurry in which the particulate binder resins and inorganic particles are dispersed in an aqueous dispersion medium on at least one surface of a porous polymer substrate.

Another aspect of the present disclosure relates to an electrochemical device, in which the electrochemical device includes an anode, a cathode, and a separator interposed between the anode and the cathode, in which the separator is that described herein.

Another aspect of the present disclosure is that wherein the electrochemical device is a lithium secondary battery.

The organic/inorganic composite porous coating layer of the separator, according to the present disclosure, includes acrylic-containing polymer particles and first inorganic particles, in which the acrylic-containing polymer particles have an average particle diameter (D50) "a" in a range of 2 μm to 7.5 μm, and the first inorganic particles have the average particle diameter (D50) "b" in a range of 200 nm to 800 nm, and a/b is 2 to 15. Since the average particle diameter (D50) of the acrylic-containing polymer particles is at least two times larger than the average particle diameter (D50) of the first inorganic particles, even when high pressure is applied during a lamination process with an electrode, inorganic particles of the organic/inorganic composite porous coating layer may be less likely to cause damage to the porous polymer substrate and may improve a thickness reduction of the porous polymer substrate, and a deformation of the pore structure.

In addition, the organic/inorganic composite porous coating layer of the separator, according to the present disclosure, includes hybrid polymer particles of a fluorine-containing polymer and an acrylic-containing polymer having an average particle diameter (D50) smaller than the average particle diameter (D50) of the acrylic-containing polymer particles. Since the fluorine-containing polymer included in the hybrid polymer particles is insoluble in the electrolyte, the hybrid polymer particles retain their shape even if they are soaked in the electrolyte, even if the acrylic-containing polymer is included at the same time. Accordingly, the separator of the present disclosure may maintain adhesion force with the electrode without significantly losing adhesion force with the electrode even in a wet state. Additionally, the acrylic-containing polymer particles further contribute to maintaining adhesion force of the separator to the electrode in a dry state.

Accordingly, in a roll-to-roll continuous process of manufacturing an electrode assembly by laminating an electrode and the separator of the present disclosure, there may be an effect of improving the dielectricity deterioration of the separator and improving the shape stability and processability of the electrode assembly. In addition, by manufacturing a battery using the electrode assembly including the separator disclosed herein, it is possible to maintain a high binding force between the separator and the electrode even in a state soaked with the electrolyte (wet state), thereby improving the interfacial resistance characteristics. In addition, since the binder polymer particles maintain high adhesion force in a dry or wet state, the inorganic particles included in the organic/inorganic composite porous coating layer are not detached and are well fixed so that the morphological stability of the separator may be improved. Accordingly, there may be an effect of improving the thermal stability and dielectric property of the battery.

BRIEF DESCRIPTION OF THE DRAWINGS

The accompanying drawings illustrate aspects of the disclosure and together with the detailed description, explain the principles of the disclosure, but the scope of the disclosure is not limited thereto. On the other hand, the shape, size, scale, or ratio of elements in the drawings included in this specification may be exaggerated to emphasize a clearer description.

DESCRIPTION OF THE PREFERRED ASPECTS

Terms or words used in the specification and claims should not be construed as conventional or dictionary meanings, but should be construed as meanings and concepts conforming to the technical idea of this disclosure based on the principle that the inventors may appropriately define the concept of terms to describe their disclosure in the best way. Therefore, since the configurations described in the aspects described herein are only certain aspects of the present disclosure and do not represent all the technical ideas of the present disclosure, it should be understood that there may be various equivalents and modifications that may replace them at the time of the present application.

The term "include" used in this disclosure is used to list materials, compositions, devices, and methods useful for this disclosure and is not limited to the listed examples.

Throughout the specification, the expression "a part 'comprise (s)' an element" or the element is "comprised in" the part, is intended to indicate that such element is present in the recited part. This does not preclude the presence of any additional elements but means that the part may further comprise the other elements.

As used herein, "about" and "substantially" are used in the sense of a range or close to that number or degree, in consideration of inherent manufacturing and material tolerances, and accurate or absolute figures provided to aid understanding of the disclosure are used to prevent the infringer from unfairly exploiting the stated disclosure.

As used herein, "electrochemical device" may mean a primary battery, a secondary battery, a super capacitor, or the like.

Figure 1:
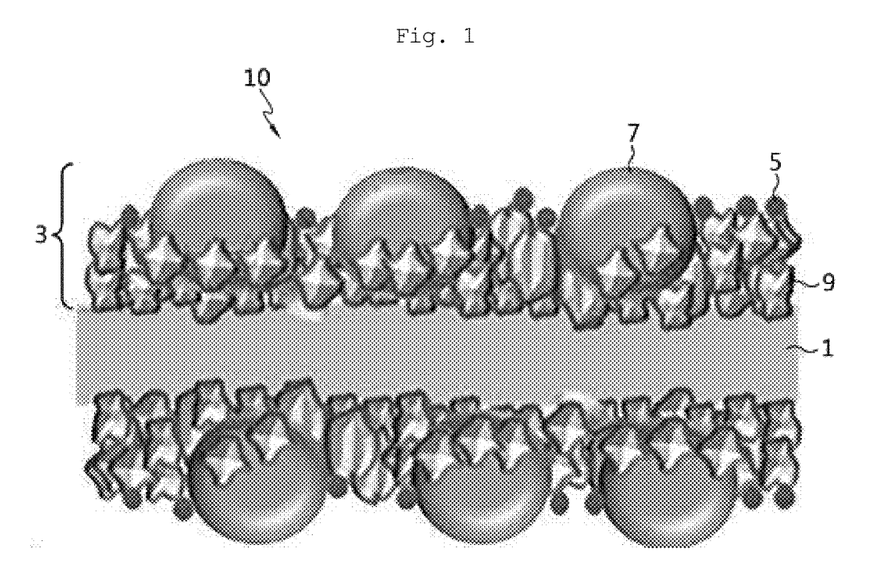
FIG. 1 is a schematic diagram showing a cross-section of a separator according to an aspect of the present disclosure.

FIG. 1 is a schematic diagram showing a cross-section of a separator 10 for an electrochemical device according to an aspect of the present disclosure.

In an aspect of the present disclosure, the separator 10 includes a porous polymer substrate 1 and an organic/inorganic composite porous coating layer 3 formed on at least one side of the polymer substrate. Although FIG. 1 shows that the organic/inorganic composite porous coating layer 3 is formed on both sides surface of the polymer substrate 1, the organic/inorganic composite porous coating layer 3 may also be formed only on one side surface of the porous polymer substrate 1.

The organic/inorganic composite porous coating layer 3 includes particulate binder polymers 5 and 7 and first inorganic particles 9. The particulate binder polymers 5 and 7 include hybrid polymer particles 5 of a fluorine-containing polymer and an acrylic-containing polymer and acrylic-containing polymer particles 7.

As shown in FIG. 1, the organic/inorganic composite porous coating layer 3 includes acrylic-containing polymer particles 7 and first inorganic particles 9, and the average particle diameter (D50) "a" of the acrylic-containing polymer particles 7 is in a range of 1 µm to 7.5 µm, the average particle diameter (D50) "b" of the first inorganic particles 9 is in a range of 200 nm to 800 nm, and a/b is 2 to 15.

Since the average particle diameter (D50) of the acrylic-containing polymer particles 7 is at least two times larger than the average particle diameter (D50) of the first inorganic particles 9, even when high pressure is applied during a lamination process with an electrode, inorganic particles 9 of the organic/inorganic composite porous coating layer 3 are less likely to cause damage to the porous polymer substrate 1, and improves a thickness reduction of the porous polymer substrate 1, and a deformation of the pore structure. If a/b is less than 2, compression resistance may not be sufficient, and if a/b exceeds 15, resistance may be excessively high. When the average particle diameter (D50) "a" of the acrylic-containing polymer particles 7 is less than 1 µm, there is a risk that the adhesion force may be lowered, and when the average particle diameter (D50) of the acrylic-containing polymer particles exceeds 7.5 µm, there may be a risk that the resistance may be excessively increased. When the average particle diameter (D50) "b" of the first inorganic particles 9 is less than 200 nm, the dispersibility in the slurry may be decreased, and when the average particle diameter (D50) "b" of the first inorganic particles 9 is more than 800 nm, the thickness of the organic/inorganic composite porous coating layer may be excessively increased or pores may be excessively large. In this aspect, the average particle diameter (D50) "a" of the acrylic-containing polymer particles may be 1 µm to 6 µm, more specifically 2 µm to 6 µm, and even more specifically 3 µm to 5 µm. As described herein, the average particle diameter (D50) "a" of the acrylic-containing polymer particles may have any value or range selected from the following: 1 µm, 1.5 µm, 2 µm, 2.5 µm, 3 µm, 3.5 µm, 4 µm, 4.5 µm, 5 µm, 5.5 µm, 6 µm, 6.5 µm, 7 µm and 7.5 µm. In addition, the average particle diameter (D50) "b" of the first inorganic particles may be in a range of 300 nm to 700 nm, more specifically 400 nm to 600 nm. As described herein, the average particle diameter (D50) "b" of the first inorganic particles may have any value or range selected from the following: 200 nm, 250 nm, 300 nm, 350 nm, 400 nm, 450 nm, 500 nm, 550 nm, 600 nm, 650 nm, 700 nm, 750 nm and 800 nm. a/b may be 3 to 13, more specifically 5 to 12, and even more specifically 6 to 11. As described herein, the a/b may have any value or range selected from the following: 2, 2.5, 3, 3.5, 4, 4.5, 5, 5.5, 6, 6.5, 7, 7.5, 8, 8.5, 9, 9.5, 10, 10.5, 11, 11.5, 12, 12.5, 13, 13.5, 14, 14.5 and 15.

On the other hand, the acrylic-containing polymer particles 7 also contribute to maintaining the adhesion force of the separator to the electrode in a dry state.

In addition, the organic/inorganic composite porous coating layer 3 of the separator 10, according to the present disclosure, includes hybrid polymer particles 5 of a fluorine-containing polymer and an acrylic-containing polymer having an average particle diameter (D50) smaller than the average particle diameter (D50) of the acrylic-containing polymer particles 7. Since the fluorine-containing polymer included in the hybrid polymer particles 5 is insoluble in the electrolyte, the hybrid polymer particles 5 maintain their shape even when wet in the electrolyte and even if the acrylic-containing polymer is included at the same time. Accordingly, the separator 10 of the present disclosure may maintain adhesion force to the electrode without significantly losing adhesion force to the electrode even in a wet state.

By adjusting the average particle diameter (D50) of the hybrid polymer particles 5 to be smaller than the average particle diameter (D50) of the acrylic-containing polymer particles 7, this facilitates movement of the hybrid polymer particles 5 to the surface region during the coating layer formation process, as shown in FIG. 1. For instance, in an aspect of the present disclosure, the organic/inorganic composite porous coating layer 3 may have heterogeneity of composition morphology in a thickness direction, in which the content ratio of hybrid polymer particles 5/acrylic-containing polymer particles 7 present on a surface portion opposite to the surface facing the porous polymer substrate 1 is greater than the content ratio of hybrid polymer particles 5/acrylic-containing polymer particles 7 present inside (for instance, an inner portion) the organic/inorganic composite porous coating layer 3. Accordingly, the adhesion force of the separator 10 to the electrode when wet with the electrolyte may be further improved.

As such, when the hybrid polymer particles 5, the acrylic-containing polymer particles 7, or both the hybrid polymer particles 5 and the acrylic containing polymer particles 7 have heterogeneity of the composition morphology of the above-described form in the thickness direction, the polymer particles 5 and 7 may be present more on the surface portion of the organic/inorganic composite porous coating layer 3 opposite to the surface facing the porous polymer substrate 1 than inside (for instance, an inner portion) the organic/inorganic composite porous coating layer 3. Therefore, due to the adhesive force characteristics of the polymer particles present on the surface portion being large, the dry/wet adhesive force to the electrode may further increase. In addition, resistance to external stimuli such as peeling and scratching may be increased, and lamination characteristics of the electrode may be improved. Accordingly, very excellent characteristics may be exhibited in a battery assembly process, such as winding and lamination. In addition, since the porosity may be improved due to a content of the inorganic particles that increases toward the inside portion of the organic/inorganic composite porous coating layer 3, excellent ionic conductivity characteristics may be exhibited, thereby contributing to the improvement of battery performance. In this aspect, the average particle diameter (D50) of the acrylic-containing polymer particles 7 may be 4 to 20 times larger than the average particle diameter (D50) of the hybrid polymer particles 5, and the average particle diameter (D50) of the hybrid polymer particles 5 may be in a range of 100 nm to 500 nm, but is not limited thereto. As described herein, the average particle diameter (D50) of the acrylic-containing polymer particles 7 may be larger than the average particle diameter (D50) of the hybrid polymer particles 5 by a factor having any value or range selected from the following: 4, 5, 6, 7, 8, 9, 10, 11, 12, 13, 14, 15, 16, 17, 18, 19 and 20. Also, as described herein, the average particle diameter (D50) of the hybrid polymer particles 5 may have any value or range selected from the following: 100 nm, 150 nm, 200 nm, 250 nm, 300 nm, 350 nm, 400 nm, 450 nm and 500 nm.

In addition, the mixed weight ratio of the hybrid polymer particles and the acrylic-containing polymer particles may be 8:2 to 2:8, but is not limited thereto.

In the specification of the present disclosure, "heterogeneity of composition morphology in a thickness direction, in which the content ratio of hybrid polymer particles/acrylic-containing polymer particles present on the surface portion opposite to the surface facing the porous polymer substrate is greater than the content ratio of hybrid polymer particles/acrylic-containing polymer particles present inside (e.g., inner portion) the organic/inorganic composite porous coating layer", in which if the content ratio of hybrid polymer particles/acrylic-containing polymer particles present on the surface portion of the organic/inorganic composite porous coating layer opposite to the surface facing the porous polymer substrate is greater than the content ratio of hybrid polymer particles/acrylic-containing polymer particles present under the surface portion (inside or inner portion) of the porous coating layer, it should be interpreted that any aspect is included. For example, it should be interpreted as a meaning including all of the porous coating layer formed so that the content ratio of the hybrid polymer particles/acrylic-containing polymer particles decreases linearly from the surface portion of the porous coating layer to the porous substrate, the porous coating layer formed so that the content ratio of the hybrid polymer particles/acrylic-containing polymer particles non-linearly decreases from the surface portion of the porous coating layer to the porous substrate, and the porous coating layer formed so that the content ratio of the hybrid polymer particles/acrylic-containing polymer particles discontinuously decreases from the surface portion of the porous coating layer to the porous substrate, etc.

The organic/inorganic composite porous coating layer 3 may have heterogeneity of composition morphology in a thickness direction, in which the content of hybrid polymer particles 5 present on a surface portion opposite to the surface facing the porous polymer substrate 1 is greater than the content of hybrid polymer particles 5 present inside (e.g., inner portion) the organic/inorganic composite porous coating layer. In addition, the organic/inorganic composite porous coating layer 3 may have heterogeneity of composition morphology in a thickness direction, in which the content of acrylic-containing polymer particles 7 present on a surface portion opposite to the surface facing the polymer substrate 1 is greater than the content of acrylic-containing polymer particles 7 present inside (e.g., inner portion) the organic/inorganic composite porous coating layer 3.

As described herein, in a roll-to-roll continuous process of manufacturing an electrode assembly by laminating an electrode and the separator 10 of the present disclosure, there may be an effect of improving the dielectricity deterioration of the separator 10, and improving the shape stability and processability of the electrode assembly. In addition, since a high binding force between the separator 10 and the electrode may be maintained even when a battery is manufactured using the electrode assembly including the separator 10 and soaked with an electrolyte, the interfacial resistance characteristic may be improved. In addition, since the binder polymer particles 5 and 7 maintain high adhesion force in dry or wet conditions, the inorganic particles 9 included in the organic/inorganic composite porous coating layer 3 are not detached and are well fixed. Therefore, the shape stability of the separation membrane 10 may be improved. Accordingly, there is an effect of improving the thermal stability and dielectric property of the battery.

According to an aspect of the present disclosure, the porous polymer substrate 1 is capable of providing a movement path of lithium ions while preventing a short circuit by electrically insulating the anode and the cathode and may be used without particular limitation as long as it is generally used as a separator polymer substrate of an electrochemical device. As examples of the separator substrate, for example, a porous polymer film or nonwoven fabric including at least one of polymer resins among polyolefins such as polyethylene, polyethylene terephthalate, polybutylene terephthalate, polyacetal, polyamide, polycarbonate, polyimide, polyether ether ketone, polyether sulfone, polyphenylene oxide, polyphenylene sulfide, and polyethylene naphthalate may be used.

In the present disclosure, the thickness of the polymer substrate may be 3 μm to 50 μm. Although the range of the separator substrate is not particularly limited to the aforementioned range, if the thickness is less than the above-described lower limit, mechanical properties may be lowered, and the separator may be easily damaged during the use of battery. Meanwhile, the pore size and porosity present in the separator substrate are also not particularly limited but may be 0.01 μm to 50 μm and 10 to 95 vol %, respectively.

The organic/inorganic composite porous coating layer 3 may be made by mixing a plurality of inorganic particles 9 and particulate binder polymers 5 and 7. Since the polymer substrate 1 is coated by the porous coating layer 3 including inorganic particles 9, heat resistance and mechanical properties of the separator 10 may be further improved. According to an aspect of the present disclosure, the organic/inorganic composite porous coating layer 3 is disposed on both sides of the polymer substrate 1. As described above, by forming the porous coating layer 3 on both sides of the porous substrate 1, wet adhesion force and dry adhesion force between the cathode and the separator and between the anode and the separator may be improved.

The organic/inorganic composite porous coating layer 3 may have a microporous structure due to an interstitial volume between the constituent inorganic particles 9 and the particulate binder polymers 5 and 7. The inorganic particles 9 serve as a kind of spacer capable of maintaining the physical shape of the porous coating layer 3. The interstitial volume refers to a space limited by substantially being in surface contact with the particles of the inorganic particles 9 and the particulate binder polymers 5 and 7. In addition, since the inorganic particles 9 generally have characteristics that do not change their physical properties even at a high temperature (for instance, 200° C. or higher), the separator 10 may have excellent heat resistance by the organic/inorganic composite porous coating layer 3. In the present disclosure, the organic/inorganic composite porous coating layer 3 may have a thickness in a range of 1 μm to 50 μm, 2 μm to 30 μm, or 2 μm to 20 μm based on what is formed on either side of the porous substrate 1.

In the present disclosure, particulate polymers 5 and 7 refer to binder polymers that are added to the dispersion medium in the form of particles to form the porous coating layer 3 and maintain the added particle shape after coating and drying and are distinguished from a "non-particulate" binder polymer defined as a binder polymer that loses a particulate phase during drying and transforming into a film-like form when forming a coating layer, even if it is dissolved in a solvent or not dissolved in a solvent. That is, in the present disclosure, "particle" is defined as maintaining substantially the same shape of added particles, and the shape may be circular particles but is not limited thereto. As such, since the polymer particles maintain a particulate form, they may hardly penetrate into the pores of the porous polymer substrate, thereby contributing to improving the decrease in clogging of the pores of the porous polymer substrate.

In one aspect of the present disclosure, the particulate binder polymers 5 and 7 may be present in an amount of about 90% by weight or more or about 99% by weight or more based on the binder components present in the porous coating layer 3. In the present specification, the particulate binder polymers 5 and 7 may be referred to as polymer particles, resin particles, or binder particles. The particulate binder polymers 5 and 7 form a porous coating layer 3 that may have a layered structure through the adhesion between the inorganic particles 9 and mutual adhesion between the inorganic particles 9 and the polymer substrate 1.

The hybrid polymer particles 5 may be prepared to refer to, for example, WO 2020/263936, which is herein incorporated by reference into the present disclosure.

The fluorine-containing polymer included in the hybrid polymer particles may be an electrolyte insoluble polymer of a homopolymer of vinylidene fluoride, a copolymer of vinylidene fluoride and another polymerizable monomers, or a mixture of two or more thereof.

Vinylidene fluoride and the another polymerizable monomers may include at least one selected from the group consisting of tetrafluoroethylene, hexafluoropropylene, trifluoroethylene, chlorofluoroethylene, 1,2 difluoroethylene, perfluoro(methylvinyl)ether, perfluoro(ethylvinyl)ether, perfluoro(propylvinyl)ether, perfluoro ((1,3 dioxole), perfluoro (2,2-dimethyl-1,3-dioxole), trichloroethylene, and vinyl fluoride, but are not limited thereto. In particular, the fluorine-containing polymer may be a copolymer of vinylidene fluoride and hexafluoropropylene. The content of vinylidene fluoride and the another polymerizable monomers may be 1 to 20% by weight of the copolymer but is not limited thereto.

In the present disclosure, the content of the comonomer in the PVDF-containing polymer may be measured by 1H-NMR method using Varian 500 MHZ. For detailed measurement methods, refer to Journal of Materials Chemistry, 2012, 22, 341 or AMT-3412-0k. For the confirmation of the NMR spectrum, suitable equipment such as Bruker Avance III HD 700 MHz NMR or Varian 500 MHZ NMR may be used.

The acrylic-containing polymer constituting the hybrid polymer particles and the acrylic-containing polymer constituting the acrylic-containing polymer particles may each independently include an alkyl methacrylate repeating unit having an alkyl group having 1 to 18 carbon atoms but are not limited thereto.

In one aspect of the present disclosure, the glass transition temperature (Tg) of the acrylic-containing polymer included in the hybrid polymer particles may be more than 10° C. lower than the Tg of the acrylic-containing polymer included in the acrylic-containing polymer particles. Since the lower the Tg of the acrylic polymer, the better the adhesive force, and thus the lower the Tg of the acrylic polymer included in the hybrid polymer particles, the higher the dry/wet adhesive force of the hybrid polymer particles to the electrodes.

More specifically, the Tg of the acrylic-containing polymer included in the hybrid polymer particles may be 10° C.

to 30° C. (including any Tg (° C.) as a value or range selected from 10, 15, 20, 25 and 30), and the Tg of the acrylic-containing polymer included in the acrylic-containing polymer particles may be 30° C. to 50° C. (including any Tg (° C.) as a value or range selected from 30, 35, 40, 45 and 50). Although the acrylic-containing polymer included in the hybrid polymer particles has a low Tg, the particulate form even at room temperature due to the mixed fluorine-containing polymer may be maintained. In addition, when the Tg of the acrylic-containing polymer included in the acrylic-containing polymer particles is selected to be higher than or equal to room temperature, the particle shape may be maintained at room temperature to express electrode adhesion force during lamination with the electrode.

More specifically, the acrylic-containing polymer may include a carboxylic acid ester as a repeating unit and may be a (meth)acrylate ester. Specific examples of such (meth)acrylic acid ester may include, for example, (meth)methyl acrylate, (meth)acrylate, i-propyl (meth)ethyl acrylate, n-propyl (meth)acrylate, n-butyl (meth)acrylate, i-butyl (meth)acrylate, n-amyl (meth)acrylate, i-amyl (meth)acrylate, hexyl (meth)acrylate, cyclohexyl (meth)acrylate, 2-ethylhexyl (meth)acrylate, n-Octyl (meth)acrylate, nonyl (meth)acrylate, decyl (meth)acrylate, hydroxymethyl (meth)acrylate, hydroxyethyl (meth)acrylate, ethylene glycol (meth)acrylate, ethylene glycol di(meth)acrylate, propylene glycol di(meth)acrylate, trimethylolpropane tri(meth)acrylate, pentaerythritol tetra(meth)acrylate, dipentaerythritol hexa(meth)acrylate, allyl (meth)acrylate, ethylene di(meth)acrylate, and the like, and may be at least one selected among them. Among these, at least one selected from methyl (meth)acrylate, ethyl (meth)acrylate, and 2-ethylhexyl (meth)acrylate is disclosed, and methyl (meth)acrylate is particularly disclosed.

The organic/inorganic composite porous coating layer may include the particulate binder polymers in an amount of 18 to 30% by weight of the organic/inorganic composite porous coating layer but is not limited thereto.

The organic/inorganic composite porous coating layer may further include a non-particulate acrylic-containing polymer. Non-particulate acrylic-containing polymers are acrylic-containing polymers that do not dissolve in an aqueous dispersion medium but do not maintain a particulate form, for example, acrylic-containing polymers having a low Tg of 0° C. or less. The non-particulate acrylic-containing polymer may improve the adhesion force of the organic/inorganic composite porous coating layer to the electrode and the binding force between the inorganic particles and between the inorganic particles and the polymer substrate. The non-particulate acrylic-containing polymer may be added in an amount of 10% by weight or less based on the total weight of the binder polymers included in the organic/inorganic composite porous coating layer but is not limited thereto.

Meanwhile, the first inorganic particles included in the organic/inorganic composite porous coating layer are not particularly limited as long as they are electrochemically stable. That is, the inorganic particles are not particularly limited as long as oxidation and/or reduction reactions do not occur in the operating voltage range of the applied electrochemical device (e.g., 0 to 5 V based on Li/Li$^+$). In particular, when first inorganic particles having an ion transport ability are used, performance may be improved by increasing ion conductivity in the electrochemical device. In addition, when inorganic particles having a high dielectric constant are used as the first inorganic particles, the ionic conductivity of the electrolyte may be improved by contributing to an increase in the degree of dissociation of an electrolyte salt, such as a lithium salt, in a liquid electrolyte.

For the above reasons, the first inorganic particles may include inorganic particles having a high dielectric constant of 5 or more or 10 or more, inorganic particles having lithium ion transport ability, or a mixture thereof. Non-limiting examples of inorganic particles having a dielectric constant of 5 or more include $BaTiO_3$, $Pb(Zr, Ti)O_3$ (PZT), $Pb_{1-x}La_xZr_{1-y}Ti_yO_3$ (PLZT, where, $0<x<1$, $0<y<1$), $Pb(Mg_{1/3} Nb_{2/3})O_3$—$PbTiO_3$ (PMN-PT), hafnia ($HfO_2$), $SrTiO_3$, $SnO_2$, $CeO_2$, MgO, Nio, Cao, Zno, $ZrO_2$, $Y_2O_3$, alumina ($Al_2O_3$), boehmite, SiC, $TiO_2$, etc., alone or a mixture of two or more. In addition, when the above-described high dielectric constant inorganic particles and the inorganic particles having lithium ion transport ability are mixed, their synergistic effect may be increased, for instance, doubled.

Non-limiting examples of the inorganic particles having lithium ion transport ability include lithium phosphate ($Li_3PO_4$), lithium titanium phosphate ($Li_xTi_y(PO_4)_3$, $0<x<2$, $0<y<3$), lithium aluminum titanium phosphate ($Li_xAl_yTi_z$)($PO_4)_3$, $0<x<2$, $0<y<1$, $0<z<3$), (LiAlTiP)$_xO_y$-containing glass ($0<x<4$, $0<y<13$), such as, $14Li_2O$-$9Al_2O_3$-$38TiO_2$-$39P_2O_5$, lithium lanthanum titanate ($Li_xLa_yTiO_3$, $0<x<2$, $0<y<3$), lithium germanium thiophosphate ($Li_xGe_yP_zS_w$, $0<x<4$, $0<y<1$, $0<z<1$, $0<w<5$), such as, $Li_{3.25}Ge_{0.25}P_{0.75}S_4$, etc., lithium nitride ($Li_xN_y$, $0<x<4$, $0<y<2$), such as, $Li_3N$, $SiS_2$-containing glass ($Li_xSi_yS_z$, $0<x<3$, $0<y<2$, $0<z<4$), such as, $Li_3PO_4$—$Li_2S$—$SiS_2$, $P_2S_5$-containing glass ($Li_xP_yS_z$, $0<x<3$, $0<y<3$, $0<z<7$), such as, $LiI$—$Li_2S$—$P_2S_5$, etc., or a mixture thereof.

Meanwhile, the organic/inorganic composite porous coating layer may further include second inorganic particles having an average particle diameter (D50) smaller than or equal to the average particle diameter (D50) of the first inorganic particles and different from the first inorganic particles. By mixing these second inorganic particles, the packing density of the porous coating layer may be improved, thereby further improving heat resistance. In this aspect, the average particle diameter (D50) of the second inorganic particle may be in a range of 100 nm to 500 nm. As described herein, the average particle diameter (D50) of the second inorganic particles may have any value or range selected from the following: 100 nm, 150 nm, 200 nm, 250 nm, 300 nm, 350 nm, 400 nm, 450 nm and 500 nm.

As the second inorganic particles, any of the above-described first inorganic particles may be used. In particular, alumina may be used as the first inorganic particle, and boehmite may be used as the second inorganic particles.

In the organic/inorganic composite porous coating layer, the content ratio of the inorganic particles is determined in consideration of the thickness, pore size, and porosity of the finally prepared organic/inorganic composite porous coating layer, but the inorganic particles may be included in a range of 70% to 99% by weight based on 100% by weight of the porous coating layer. When the content of the inorganic particles is less than 70% by weight, heat resistance may be reduced. Also, when the content of the inorganic particles is too large, the amount of the binder is relatively too small, and thus the adhesive force of the porous coating layer may be degraded.

When both first and second inorganic particles are present, the total amount of inorganic particles is as disclosed above, which is in a range of 70% to 99% by weight based on 100% by weight of the porous coating layer. A ratio of weight content of first:second inorganic particles may be 5:95, 10:90, 15:85, 20:80, 25:75, 30:70, 35:65, 40:60, 45:55, 50:50, 55:45, 60:40, 65:35, 70:30, 75:25, 80:20, 85:15, 90:10 and 95:5.

In one aspect of the present disclosure, the separator, including the organic/inorganic composite porous coating layer, may be prepared by mixing binder particles and inorganic particles with an aqueous dispersion medium to prepare a slurry for forming a coating layer, and then coating the slurry on at least one side surface of a porous polymer substrate.

As the coating method, dip coating, die coating, roll coating, comma coating, or a mixture thereof may be used.

In one aspect of the present disclosure, the aqueous dispersion medium may include at least one of water and an alcohol having 1 to 5 carbon atoms. For example, the aqueous dispersion medium may include a mixture of water and isopropyl alcohol. By using the aqueous dispersion medium in the above production method, the binder particles are dispersed while maintaining the particle shape in the aqueous dispersion medium without being dissolved in the dispersion medium. For this reason, the binder particles are able to maintain a particulate state in the prepared organic/inorganic composite porous coating layer and do not enter the pores of the porous polymer substrate.

In an aspect of the present disclosure, the slurry for forming the coating layer is controlled so that the concentration of the solids, excluding the dispersion medium, is in the range of 20% to 50% by weight. It may be advantageous to obtain a separator having an organic/inorganic composite porous coating layer having heterogeneity of the composition morphology of the present disclosure by controlling the concentration of solids, the average particle diameters, and the content ratio of the injected binder particles within the above range.

The separator of this disclosure may be applied to an electrochemical device. The electrochemical device may include an anode and a cathode, and the separator may be interposed between the anode and the cathode. The electrochemical device may include all devices that perform an electrochemical reaction, and specific examples thereof include all kinds of primary cells, secondary cells, fuel cells, solar cells, or capacitors. In particular, a lithium ion secondary battery, including a lithium metal secondary battery, a lithium ion secondary battery, a lithium polymer secondary battery, or a lithium ion polymer secondary battery among the secondary batteries is disclosed.

In an aspect according to the present disclosure, the electrochemical device may be manufactured according to a conventional method known in the art. According to an aspect of the present disclosure, the electrochemical device may be configured by a method of interposing the above-described separator between the cathode and the anode.

That is, the prepared separator may be interposed between the anode and the cathode and may be manufactured as an electrode assembly by a lamination process in which heat and/or pressure are applied to bind the separator. In an aspect of the present disclosure, the lamination process may be performed by a roll press device including a pair of pressure rollers. That is, an anode, a separator, and a cathode may be sequentially stacked and put between the pressure rollers to achieve interlayer bonding. In this case, the lamination process may be performed by a method of hot pressing.

The electrochemical device may be manufactured by loading an electrode assembly assembled by laminating an anode, a separator, and a cathode in a battery case and then injecting an electrolyte.

In an aspect of the present disclosure, the electrode is not particularly limited, and the electrode active material may be prepared in the form of being adhered to the electrode current collector according to a conventional method known in the art. As non-limiting examples of the cathode active material among the electrode active materials, conventional cathode active material that may be used in cathode of conventional electrochemical device may be used, and in particular, lithium manganese oxide, lithium cobalt oxide, lithium nickel oxide, lithium iron oxide, or lithium intercalation material such as a composite oxide formed by a combination thereof is preferable. As non-limiting examples of the anode active material, a conventional anode active material that may be used in the anode of a conventional electrochemical device may be used, and in particular, lithium metal or lithium alloy, lithium adsorption materials such as carbon, petroleum coke, activated carbon, graphite, or other carbons are preferable. As non-limiting examples of the cathode current collector include a foil made of aluminum, nickel, or a combination thereof, and non-limiting examples of the anode current collector include a foil made of copper, gold, nickel, or a copper alloy or a combination thereof.

The electrolyte solution that may be used in the present disclosure is a salt having the same structure as $A^+B^-$, and $A^+$ includes ions formed of alkali metal cations such as Lit, Nat, K+, or a combination thereof, or B− includes $PF_6^-$, $BF_4^-$, $Cl^-$, $Br^-$, $I^-$, $ClO_4^-$, $AsF_6^-$, $CH_3CO_2^-$, $CF_3SO_3^-$, $N(CF_3SO_2)_2^-$, $C(CF_2SO_2)_3^-$, or a combination thereof. In the electrolyte, the salt may be dissolved or dissociated in an organic solvent or an organic solvent consisting of a mixture thereof including propylene carbonate (PC), ethylene carbonate (EC), diethyl carbonate (DEC), dimethyl carbonate (DMC), dipropyl carbonate (DPC), dimethyl sulfoxide, acetonitrile, dimethoxyethane, diethoxyethane, tetrahydrofuran, N-methyl-2-pyrrolidone (NMP), ethylmethyl carbonate (EMC), and gamma butyrolactone (γ-butyrolactone), but is not limited thereto.

The electrolyte injection may be performed at an appropriate stage in the battery manufacturing process according to the manufacturing process and required physical properties of the final product. That is, it may be applied before assembling the battery or in the final stage of assembling the battery. As a process for applying the electrode assembly of the present disclosure to a battery, in addition to the general process of winding, lamination, stack, and folding processes of a separator and an electrode are possible.

Hereinafter, examples will be given to describe the present disclosure in detail. However, the aspects according to the present disclosure may be modified in various other forms, and the scope of the present disclosure should not be construed as being limited to the aspects described below. The aspects of the present disclosure are provided to more completely explain the present disclosure to those of ordinary skilled in the art.

EXAMPLE 1

8.2 parts by weight of hybrid polymer particles [Arkema, LBG4330LX, D50: 300 nm, hybrid polymer particles wherein a copolymer in which VDF and HFP are copolymerized (in a molar ratio of 95:5) and a copolymer of ethyl acrylate and methyl methacrylate (Tg 20° C.) are mixed in a weight ratio of 7:3], 8.2 parts by weight of acrylic-containing polymer particles [D50: 5 μm (5000 nm), a copolymer of styrene and butyl acrylate (Tg 40° C.)], 80 parts by weight of inorganic particles ($Al_2O_3$, D50: 500 nm)

were added to water and dispersed to prepare a dispersion (35% by weight of solid concentration) for forming a porous coating layer.

Next, a polyethylene material separator substrate (porosity 40%, thickness 9 μm) was provided and the prepared dispersion was coated on both sides of the separator substrate by bar coating using a doctor blade, and then dried with hot air at 50° C. using a heat gun to form a porous coating layer having a thickness of 12 μm based on the thickness of one side. The average particle diameter (D50) of the acrylic-containing polymer particles/average particle diameter (D50) (a/b) of $Al_2O_3$, the first inorganic particle, (5000/500) was 10.

Figure 2:
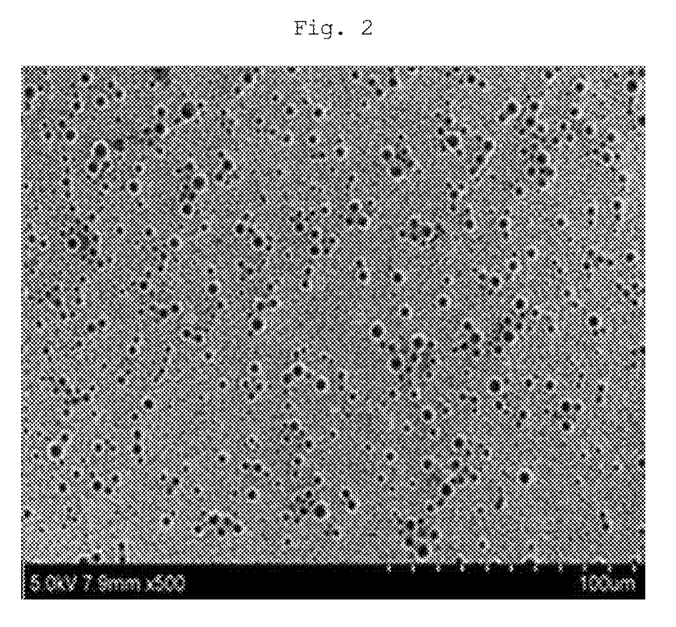
FIG. 2 is a SEM image of the surface of the separator of Example 1 before electrolyte impregnation.
Figure 3:
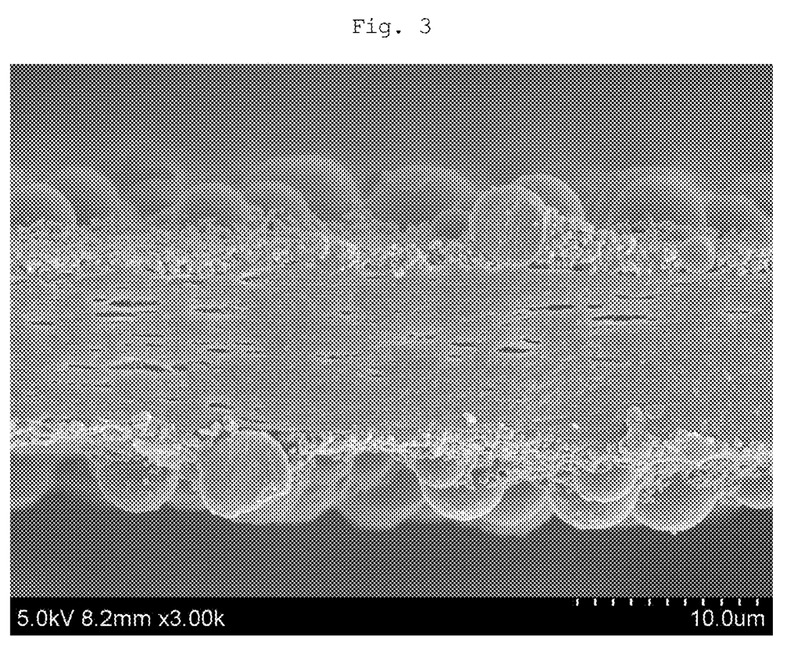
FIG. 3 is a SEM image of a cross-section of the separator according to Example 1.

FIG. 2 is a SEM image of the surface of the separator of Example 1 before being impregnated with an electrolyte, and FIG. 3 is a SEM image of a cross-section of the separator according to Example 1.

EXAMPLE 2

A porous coating layer was formed in the same manner as in Example 1, except that the content of the hybrid polymer particles was 10.2 parts by weight, the content of the acrylic-containing polymer particles was 10.2 parts by weight, and the content of the inorganic particles was changed to 75 parts by weight to prepare a dispersion (35% by weight of solid concentration) for forming the porous coating layer. The average particle diameter (D50) of the acrylic-containing polymer particles/average particle diameter (D50) (a/b) of $Al_2O_3$, the first inorganic particle, was 10.

EXAMPLE 3

A porous coating layer was formed in the same manner as in Example 1, except that 0.9 parts by weight of a non-particulate acrylic-containing polymer [Toyochem CSB130, (D50) particle diameter 150 nm, Tg −30° C.] were additionally added to water based on the solid content. The average particle diameter (D50) of the acrylic-containing polymer particles/average particle diameter (D50) (a/b) of $Al_2O_3$, the first inorganic particle, was 10.

EXAMPLE 4

A porous coating layer was formed in the same manner as in Example 1, except that 80 parts by weight of the inorganic particles ($Al_2O_3$, D50: 500 nm) and boehmite (D50: 300 nm) were added at a weight ratio of 85:15, instead of 80 parts by weight of the inorganic particles ($Al_2O_3$, D50: 500 nm). The average particle diameter (D50) of the acrylic-containing polymer particles/average particle diameter ((a/b) of $Al_2O_3$, the first inorganic particle, was 10.

EXAMPLE 5

A porous coating layer was formed in the same manner as in Example 1, except that 8.2 parts by weight of acrylic-containing polymer particles having a smaller average particle diameter (D50) [copolymer of styrene and butyl acrylate (Tg 40° C.) (D50: 1 μm, 1000 nm)] were added instead of 8.2 parts by weight of the acrylic-containing polymer particles having a D50 of 5 μm (5000 nm) of Example 1. The average particle diameter (D50) of the acrylic-containing polymer particles/average particle diameter (D50) (a/b) of $Al_2O_3$, the first inorganic particle, (1000/500) was 2.

EXAMPLE 6

A porous coating layer was formed in the same manner as in Example 1, except that 8.2 parts by weight of acrylic-containing polymer particles having a larger average particle diameter (D50) [copolymer of styrene and butyl acrylate (Tg 40° C.) (D50: 7.5 μm, 7500 nm)] were added instead of 8.2 parts by weight of the acrylic-containing polymer particles having a D50 of 5 μm of Example 1. The average particle diameter (D50) of the acrylic-containing polymer particles/average particle diameter (D50) (a/b) of $Al_2O_3$, the first inorganic particle, (7500/500) was 15.

EXAMPLE 7

A porous coating layer was formed in the same manner as in Example 4, except that boehmite having a smaller average particle diameter (D50: 100 nm) was added.

EXAMPLE 8

A porous coating layer was formed in the same manner as in Example 4, except that boehmite having a larger average particle diameter (D50: 500 nm) was added.

COMPARATIVE EXAMPLE 1

A porous coating layer was formed in the same manner as in Example 1, except that a dispersion (35% by weight of solid concentration) for forming the porous coating layer was prepared by changing the content of the acrylic-containing polymer particles to 16.4 parts by weight without adding the hybrid polymer particles. The average particle diameter (D50) of the acrylic-containing polymer particles/average particle diameter (D50) (a/b) of $Al_2O_3$, the first inorganic particle, was 10.

COMPARATIVE EXAMPLE 2

A porous coating layer was formed in the same manner as in Example 1, except that a dispersion (35% by weight of solid concentration) for forming the porous coating layer was prepared by changing the content of the hybrid polymer particles to 16.4 parts by weight without adding acrylic-containing polymer particles. The average particle diameter (D50) of the acrylic-containing polymer particles (not present)/average particle diameter (D50) (a/b) of $Al_2O_3$, the first inorganic particle, (0/500) was 0.

COMPARATIVE EXAMPLE 3

A porous coating layer was formed in the same manner as in Example 1, except that 8.2 parts by weight of acrylic-containing polymer particles having a smaller average particle diameter (D50) [copolymer of styrene and butyl acrylate (Tg 40° ° C.) (D50: 0.9 μm, 900 nm)] were added instead of 8.2 parts by weight of the acrylic-containing polymer particles having a D50 of 5 μm of Example 1. The average particle diameter (D50) of the acrylic-containing polymer particles/average particle diameter (D50) (a/b) of $Al_2O_3$, the first inorganic particle, (900/500) was 1.8.

COMPARATIVE EXAMPLE 4

A porous coating layer was formed in the same manner as in Example 1, except that 8.2 parts by weight of acrylic-containing polymer particles having a smaller average particle diameter (D50) [copolymer of styrene and butyl acrylate (Tg 40° C.) (D50: 0.4 μm, 400 nm)] were added instead of 8.2 parts by weight of the acrylic-containing polymer particles having a D50 of 5 μm of Example 1. The average particle diameter (D50) of the acrylic-containing polymer particles/average particle diameter (D50) (a/b) of $Al_2O_3$, the first inorganic particle, (400/500) was 0.8.

COMPARATIVE EXAMPLE 5

A porous coating layer was formed in the same manner as in Example 1, except that 8.2 parts by weight of acrylic-containing polymer particles having a larger average particle diameter (D50) [copolymer of styrene and butyl acrylate (Tg 40° C.) (D50: 8 μm, 8000 nm)] were added instead of 8.2 parts by weight of the acrylic-containing polymer particles having a D50 of 5 μm (5000 nm) of Example 1. The average particle diameter (D50) of the acrylic-containing polymer particles/average particle diameter (D50) (a/b) of $Al_2O_3$, the first inorganic particle, (8000/500) was 16.

ization was performed at 60° C. for 1 second with 6.5 MPa. The size of the specimen was 2.5 cm×6 cm.

The anode was prepared as follows. Graphite, SBR, and CMC were mixed in a weight ratio of 89.2:10:0.8 and dispersed in distilled water to prepare an anode slurry, coated on a copper current collector, and dried and press-rolled to prepare an anode.

Measurement of adhesion force with electrodes

Wet adhesion force and dry adhesion force of the separator were evaluated using each specimen prepared above, and the results are summarized in Table 1 below. After each specimen was prepared, the adhesion force was measured after leaving the specimens at room temperature for 1 hour. Adhesion force was measured by peeling at an angle of 180° for dry and 90° for wet using a tensile tester (UTM equipment).

TABLE 1

|  | Ex. 1 | Ex. 2 | Ex. 3 | Ex. 4 | Ex. 5 | Ex. 6 | Ex. 7 | Ex. 8 |
| --- | --- | --- | --- | --- | --- | --- | --- | --- |
| Wet adhesion force (gf/20 mm) | 15 | 20 | 18 | 25 | 10 | 10 | 30 | 21 |
| Dry adhesion force (gf/20 mm) | 35 | 55 | 40 | 40 | 20 | 20 | 45 | 38 |
| Thickness reduction ratio after hot-pressing (%) | 20 | 10 | 20 | 15 | 20 | 20 | 7 | 8 |

|  | Comp. Ex. 1 | Comp. Ex. 2 | Comp. Ex. 3 | Comp. Ex. 4 | Comp. Ex. 5 |
| --- | --- | --- | --- | --- | --- |
| Wet adhesion force (gf/20 mm) | 0 | 30 | 20 | 25 | 0 |
| Dry adhesion force (gf/20 mm) | 60 | 5 | 45 | 45 | 0 |
| Thickness reduction ratio after hot-pressing (%) | 8 | 12 | 50 | 28 | 30 |

Measurement of average particle diameter D50

D50 is defined as the particle size based on 50% of the particle size distribution and was measured using a laser diffraction method.

Measurement of Tg

Using DSC, the Tg of a 25 mg sample was measured in a nitrogen atmosphere under conditions of a temperature increase rate of 10° C./min in a range of room temperature to 300° C.

Wet adhesion specimen production

The separator and the cathode obtained in each of Examples and Comparative Examples were laminated, impregnated in 1.0 g of the electrolyte (content ratio of ethylene carbonate: ethyl methyl carbonate=7:3, $LiPF_6$ 1 M), and left at room temperature for 24 hours. Thereafter, a specimen was prepared by lamination using a hot press. The pressurization was performed at 70° C. and 5 kgf for 5 minutes. The size of the specimen was 2 cm×6 cm.

The cathode was prepared as follows. $LiNi_{0.8}CO_{0.1}Mn_{0.1}O_2$, PVdF, and carbon black were mixed in a weight ratio of 97.0:1.5:1.5 and dispersed in 2-methyl-2-pyrrolidone to prepare a cathode slurry, coated on an aluminum current collector, and then dried and press-rolled to prepare a cathode.

Dry adhesion specimen production

The separator obtained in each Examples and Comparative Examples and an anode (described below) were laminated using a hot press to prepare a specimen. The pressur- As can be seen in Table 1, in Comparative Example 1, the dry adhesion force is high but the wet adhesion is low, so when applied to an actual battery, the battery performance may deteriorate. Comparative Example 2 has a problem in that the adhesion force is lowered during the electrode assembly manufacturing process due to low dry adhesion force. Comparative Example 3 and Comparative Example 4 have low compression resistance, which is apparent from the higher values in thickness reduction of the porous polymer substrate due to the high pressure applied when laminating the separator and the electrode, and thus the dielectricity of the separator may be deteriorated, such as the deformation of the pore structure. On the other hand, the separator, according to the Examples 1-4 exhibit a good level of wet and dry adhesive force, thereby exhibiting excellent electrochemical effects in the electrode assembly manufacturing process and battery operation.

What is claimed is:
1. An electrochemical device separator comprising
a porous polymer substrate; and
an organic/inorganic composite porous coating layer on at least one side of the porous polymer substrate, said organic/inorganic composite porous coating layer comprising particulate binder polymers, first inorganic particles and second inorganic particles, which second inorganic particles are different from the first inorganic particles, wherein the particulate binder polymers comprise:
  (a) hybrid polymer particles comprising a fluorine-containing polymer and an acrylic-containing polymer; and
  (b) acrylic-containing polymer particles, wherein the acrylic-containing polymer particles have an average particle diameter D50 "a" in a range of 1 µm to 7.5 µm,
the first inorganic particles have an average particle diameter D50 "b" in a range of 200 nm to 800 nm,
a/b is in a range of 2 to 15,
the hybrid polymer particles have an average particle diameter D50 smaller than the average particle diameter D50 of the acrylic-containing polymer particles, and
the second inorganic particles have an average particle diameter D50 smaller than or equal to the average particle diameter D50 of the first inorganic particles.

2. The electrochemical device separator of claim 1, wherein the acrylic-containing polymer particles have an average particle diameter D50 "a" in a range of 2 µm to 6 µm, and the first inorganic particles have an average particle diameter D50 "b" in a range of 300 nm to 700 nm, and a/b is in a range of 5 to 12.

3. The electrochemical device separator of claim 1, wherein the acrylic-containing polymer particles have an average particle diameter D50 that is 4 to 20 times larger than an average particle diameter D50 of the hybrid polymer particles.

4. The electrochemical device separator of claim 1, wherein the hybrid polymer particles have an average particle diameter D50 in a range of 100 nm to 500 nm.

5. The electrochemical device separator of claim 1, wherein the hybrid polymer particles and the acrylic-containing polymer particles are present as a mixture in a weight ratio of 8:2 to 2:8.

6. The electrochemical device separator of claim 1, wherein the acrylic-containing polymer present in the hybrid polymer particles has a glass transition temperature Tg that is lower, by 10° C. or more, than a Tg of the acrylic-containing polymer present in the acrylic-containing polymer particles.

7. The electrochemical device separator of claim 6, wherein the Tg of the acrylic-containing polymer present in the hybrid polymer particles is in a range of 10° C. to 30° C., and the Tg of the acrylic-containing polymer present in the acrylic-containing polymer particles is in a range of 30° ° C. to 50° C.

8. The electrochemical device separator of claim 1, wherein the fluorine-containing polymer comprises one or more selected from the group consisting of a homopolymer of vinylidene fluoride, and a copolymer of vinylidene fluoride and another polymerizable monomer.

9. The electrochemical device separator of claim 8, wherein the another polymerizable monomer comprises at least one selected from the group consisting of tetrafluoroethylene, hexafluoropropylene, trifluoroethylene, chlorofluoroethylene, 1,2-difluoroethylene, perfluoro(methylvinyl) ether, perfluoro (ethylvinyl) ether, perfluoro (propylvinyl) ether, perfluoro (1,3 dioxole), perfluoro (2,2-dimethyl-1,3-dioxole), trichloroethylene, and vinyl fluoride.

10. The electrochemical device separator of claim 8, wherein the fluorine-containing polymer is a copolymer of vinylidene fluoride and hexafluoropropylene.

11. The electrochemical device separator of claim 8, wherein a content of the other polymerizable monomer is 1% to 20% by weight of the copolymer of vinylidene fluoride and the another polymerizable monomer.

12. The electrochemical device separator of claim 1, wherein the acrylic-containing polymer present in the hybrid polymer particles and the acrylic-containing polymer present in the acrylic-containing polymer particles each independently comprise an alkyl (meth)acrylate repeating unit having an alkyl group having 1 to 18 carbon atoms.

13. The electrochemical device separator of claim 1, wherein the organic/inorganic composite porous coating layer further comprises a non-particulate acrylic-containing polymer.

14. The electrochemical device separator of claim 13, wherein the non-particulate acrylic-containing polymer has a glass transition temperature Tg of 0° C. or less.

15. The electrochemical device separator of claim 1, wherein the second inorganic particles have an average particle diameter D50 in a range of 100 nm to 500 nm.

16. The electrochemical device separator of claim 1, wherein the first inorganic particles comprise alumina and the second inorganic particles comprise boehmite.

17. The electrochemical device separator of claim 1, wherein the organic/inorganic composite porous coating layer comprises the particulate binder polymers in an amount of 1% to 30% by weight based on a total weight of the organic/inorganic composite porous coating layer.

18. The electrochemical device separator of claim 1, wherein the organic/inorganic composite porous coating layer is formed by coating and drying a slurry, and
  the particulate binder polymers and inorganic particles are dispersed in an aqueous dispersion medium on the at least one side of the porous polymer substrate.

19. An electrochemical device comprising:
  an anode, a cathode, and the electrochemical device separator according to claim 1 interposed between the anode and the cathode.

20. The electrochemical device of claim 19, wherein the electrochemical device is a lithium secondary battery.

* * * * *